March 29, 1960 — R. H. PIPKIN — 2,930,152
WHEELED SHOVEL
Filed May 14, 1958 — 2 Sheets-Sheet 1
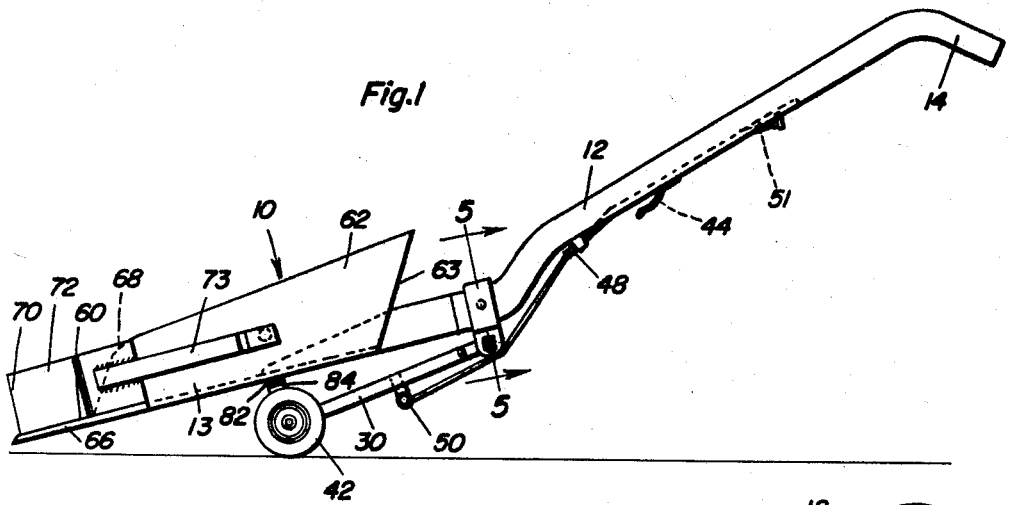
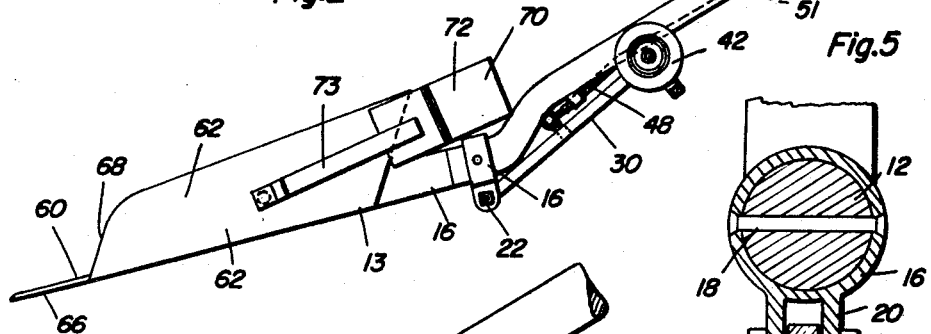
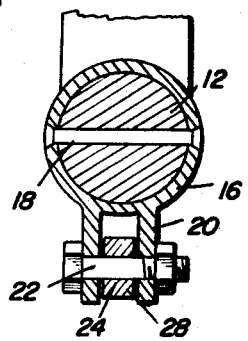
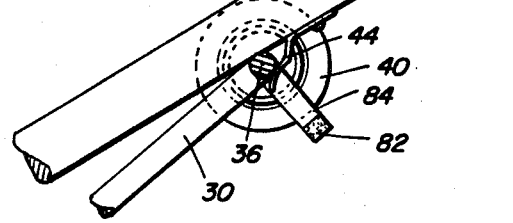
Royace H. Pipkin
INVENTOR.

March 29, 1960     R. H. PIPKIN     2,930,152
WHEELED SHOVEL
Filed May 14, 1958                                               2 Sheets-Sheet 2
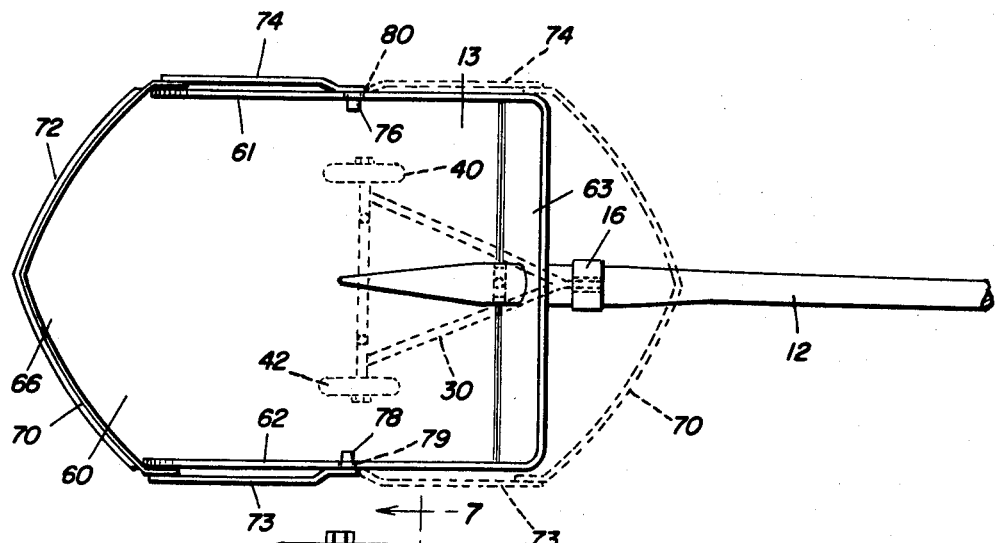
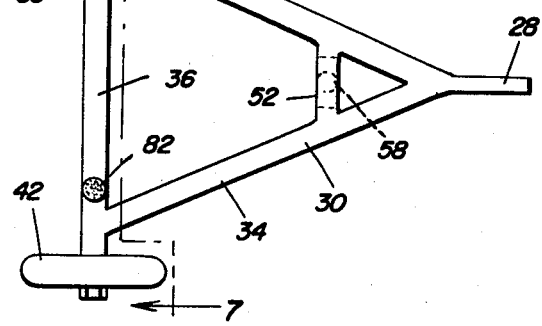
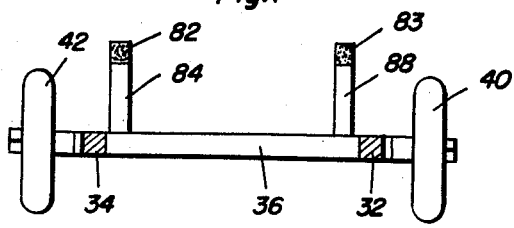
Royace H. Pipkin
        INVENTOR.

2,930,152
Patented Mar. 29, 1960

2,930,152
WHEELED SHOVEL
Royace H. Pipkin, Raleigh, N.C.

Application May 14, 1958, Serial No. 735,200

4 Claims. (Cl. 37—130)

This invention relates to a general purpose digging implement and more particularly to a shovel which has wheels thereon for facilitating multiple use of the shovel.

An object of the invention is to provide an implement of the earth working class, wherein there is a scoop at one end of a handle, together with means for facilitating the use of the scoop as a shovel and as a device for transporting loads from one place to another.

A further object of the invention is to provide a mechanically simplified wheeled shovel wherein the sides of the shovel rise a considerable distance upwardly from the bottom of the shovel, there being means that are swingable from an effective to an ineffective position on the shovel, for retaining the load on the shovel, for instance when transporting the load from one place to another.

One of the important, but optional features of the invention is a pair of wheels that are swingable between the raised and lowered positions to further aid in moving a load from one place to another. These wheels can be directly manually operated or can be operated by a mechanical aid such as a Bowden wire or lever system.

Another object of the invention is to provide a commercially feasible implement possessing the advantages of facilitating digging and materially facilitating the transporting of a load. This load can be that which is dug, for instance a plant or load of soil, or can be any other load whether it is the result of a digging operation or not.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of an implement constructed in accordance with the invention.

Figure 2 is a side view of the implement in Figure 1 showing the wheels in the raised position and the gate in the raised or ineffective position.

Figure 3 is a top view of the implement in Figure 1 showing the gate in a second position.

Figure 4 is an enlarged fragmentary detail view showing a suggested means for fastening the wheel assembly in the ineffectual position.

Figure 5 is an enlarged sectional view taken on the line 5—5 of Figure 1.

Figure 6 is a plan view of the wheeled frame used in conjunction with and as a part of the wheeled shovel implement.

Figure 7 is a sectional view taken on the line 7—7 of Figure 6.

In the accompanying drawings there is an implement 10 consisting of a lightweight but strong handle 12 having a hand-grip end 14 and having a scoop 13 at the opposite end. The scoop has a sleeve 16 within which handle 12 is fitted (Figure 5) and held in place by standard fastening means, such as rivet 18 that passes through aligned openings in the handle 12 and the sleeve 16. The rivet also supports bracket 20 that has a pair of openings accommodating pivot bolt 22.

The pivot bolt is passed through an opening 24 (Figure 5) in tongue 28 of frame 30. Frame 30 is substantially triangular having sides 32 and 34 and 36 arranged in triangular formation, with tongue 38 extending from sides 32 and 34 at the apex connection therebetween. Bolt 22, then, mounts the frame 30 so that it can be swung approximately 180° beneath the scoop and handle of the implement. The end portions of side 36 function as wheel spindles for the wheels 40 and 42 which may be of any type, preferably, though, having rather large tires of the semi-pneumatic type to facilitate movement of the implement over rough or soft terrain.

A fastener, preferably spring clip 44, is attached to the bottom part of handle 12 intermediate the upper and lower ends thereof and is adapted to engage with side 36 of frame 30 intermediate the ends thereof. This holds the frams 30, and hence wheels 40 and 42 in the raised or ineffectual position. This leaves implement 10 in such condition that it is capable of being used as a shovel. Although frame 30 can be swung about the axis of pivot bolt 22 manually and with no mechanical assistance, there is the possibility that in certain models of implement 10, mechanical aid for this operation will be desired. Such mechanical assistance can be obtained from a Bowden wire 48 that has one end secured to a short post 50 that is attached to brace 52 that extends across sides 32 and 34 of frame 30. The Bowden wire can be recessed at least in part in channel 51 (Figure 1) in the handle 12, but since the Bowden wire is capable of being made of such small diameter, it may be placed directly on the outside surface of the handle. This is merely an alternative, it being understood that other alternatives would use linkages instead of the Bowden wire. With the Bowden wire no latch will be necessary, although the fastener 44 can still be used.

Scoop 13 has a bottom 60 which may be flat or curved and has sides 61 and 62 rising from the side edges of bottom 60. A slightly inclined rear wall 63 rises from the rear edge of the bottom 60, and the front edge of bottom 60 can be pointed, sharpened or otherwise shaped. It is preferred, though, that the front edge portion 66 of bottom 60 protrude in advance of the front edges 68 (Figure 2) of sides 62 and 61 to assure a substantial and effective cutting edge on the shovel.

A gate 70 is attached to sides 61 and 62 and is a separate attachment to aid in holding a load within the scoop. The gate 70 is made of a wall 72 of elastic material, for example spring steel, and it is shaped to conform to the outer edge shape of the front portion of the bottom of scoop 13. Arms 73 and 74 are attached to the ends of wall 72 and they have short pins 76 and 78 extending inwardly at their free ends. These short pins are snapped into holes 79 and 80 in the sides 62 and 61 of the scoop. They function as pivot pins when swinging the gate 70 from the ineffectual position which is on the handle side of the scoop 13 to the operative position which is on the front portion 66 of the bottom of the scoop. These positions are shown in Figures 2 and 1 respectively. Yet, the gate 70 can be unsnapped by simply pulling the arms 73 and 74 outwardly and removing the pins 76 and 78 from the openings 79 and 80.

When moving a load in the scoop, rough riding of the scoop caused by the roughness and irregularity of the terrain can be in part attenuated by the rubber bumpers 82 and 83 that are on the posts 84 and 88. These posts are attached to the member 36 of frame 30 and protrude at right angles from the longitudinal axis thereof. The rubber bumpers are fixed to the extremities of the posts 84 and 88 and abut the bottom surface of the scoop 13.

They function as shock absorbers and as a rest for the scoop when the wheel attachment is in use. Instead of rubber bumpers or in addition to rubber bumpers it is contemplated to use springs of a correct spring constant to care for a reasonable range of loads.

The post 50 in Figure 6 forms, along with the two wheels, a tripod so that when the shovel or scoop is loaded with material, by dropping or lowering the handle the shovel and its contents will set erect, and thereby avoid spilling the contents of the shovel. For example, if a housewife had it loaded with flowers or plants and was in the process of setting them out, the shovel may be maneuvered from location to location without upsetting its contents.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A digging and carrying implement, said implement comprising a single scoop for both digging and load carrying, a handle attached to said scoop, said scoop having sides and a bottom, a gate attachment, means on said attachment and attached to said sides for mounting said gate attachment to swing to a position at which it extends across the front portion of said scoop and to a position removed therefrom, a pair of wheels, a frame to which said wheels are attached, means pivotally attaching said frame to said handle, said frame adapted to swing to a position with the wheels beneath said scoop and to a position with the wheels adjacent to the handle, and means connected with said handle and said frame to releasably hold said frame and said wheels in said position with the wheels adjacent to said handle in which position said scoop may be used for digging and shoveling.

2. A wheeled shovel comprising a scoop, a handle attached to said scoop, a frame, means pivotally mounting said frame on said handle, a pair of wheels on said frame to support the scoop when said frame is in a first position, resilient means attached to said frame and against which the bottom of the scoop is adapted to bear so that the wheels aid in the support of the scoop, means connected with said frame for pivotally moving said frame to a second position removed from beneath said scoop at which said scoop may be used for digging and shoveling, means connected to said handle and operatively engageable with a part of said frame for holding said frame releasably in said second position.

3. A wheeled shovel comprising a scoop, a handle attached to said scoop, a frame, means pivotally mounting said frame on said handle, a pair of wheels on said frame to support the scoop when said frame is in a first position, resilient means attached to said frame and against which the bottom of the scoop is adapted to bear so that the wheels aid in the support of the scoop, means connected with said frame for pivotally moving said frame to a second position removed from beneath said scoop at which said scoop may be used for digging and shoveling, means connected to said handle and operatively engageable with a part of said frame for holding said frame releasably in said second position, said scoop having a back wall and sides rising from the bottom of said scoop, the front portion of said bottom constituting a digging portion and protruding in advance of said scoop sides, a gate, means pivotally attaching said gate to said scoop, said gate having a wall of a shape which is similar to the edge shape of said portion of said scoop bottom and adapted to rest thereon when said gate is in one position.

4. A wheeled shovel comprising a scoop, a handle attached to said scoop, a frame, means pivotally mounting said frame on said handle, a pair of wheels on said frame to support the scoop when said frame is in a first position, resilient means attached to said frame and against which the bottom of the scoop is adapted to bear so that the wheels aid in the support of the scoop, means connected with said frame for pivotally moving said frame to a second position removed from beneath said scoop at which said scoop may be used for digging and shoveling, means connected to said handle and operatively engageable with a part of said frame for holding said frame releasably in said second position, said scoop having a back wall and sides rising from the bottom of said scoop, the front portion of said bottom constituting a digging portion and protruding in advance of said scoop sides, a gate, means pivotally attaching said gate to said scoop, said gate having a wall of a shape which is similar to the edge shape of said portion of said scoop bottom and adapted to rest thereon when said gate is in one position, said gate movable to a second position removed from said digging portion of said scoop bottom in which position said scoop may be used for digging and shoveling.

References Cited in the file of this patent

UNITED STATES PATENTS

| | | |
|---|---|---|
| 583,384 | Kenaga | June 1, 1897 |
| 1,683,732 | Selin | Sept. 11, 1928 |
| 2,342,436 | Stuart | Feb. 22, 1944 |
| 2,519,146 | Marshall | Aug. 15, 1950 |
| 2,599,354 | Stableford | June 3, 1952 |
| 2,727,751 | Souris | Dec. 20, 1955 |